United States Patent [19]

Nosaki et al.

[11] Patent Number: 5,151,797
[45] Date of Patent: Sep. 29, 1992

[54] IMAGE FORMING APPARATUS WITH IMPROVED IMAGE FORMING SPEED

[75] Inventors: Takefumi Nosaki, Yokohama; Kazuo Sasama, Kawasaki, both of Japan

[73] Assignee: Kabushiki Kaisha Toshiba, Kawasaki, Japan

[21] Appl. No.: 465,362

[22] Filed: Jan. 16, 1990

[30] Foreign Application Priority Data

Jan. 27, 1989 [JP] Japan ................................. 1-16211

[51] Int. Cl.⁵ ............................................... H04N 1/40
[52] U.S. Cl. .................................... 358/474; 358/448; 358/494; 358/497
[58] Field of Search ............... 358/486, 494, 466, 474, 358/497, 448

[56] References Cited

U.S. PATENT DOCUMENTS

| | | | |
|---|---|---|---|
| 4,134,135 | 1/1979 | Inokuchi et al. | 358/494 |
| 4,150,873 | 4/1979 | Dali | 358/494 |
| 4,314,281 | 2/1982 | Wiggins et al. | 358/494 |
| 4,833,544 | 5/1989 | Sato et al. | 358/494 |
| 4,864,416 | 9/1989 | Ishikawa | 358/486 |
| 4,914,523 | 4/1990 | Kimura | 358/466 |
| 5,016,116 | 5/1991 | Maeshima | 358/448 |
| 5,075,785 | 12/1991 | Sugishima | 358/448 |

*Primary Examiner*—Edward L. Coles, Sr.
*Assistant Examiner*—Thomas L. Stoll
*Attorney, Agent, or Firm*—Foley & Lardner

[57] ABSTRACT

An image forming apparatus including an image reading unit for reading image data with movement of a scanner, an image forming unit for forming an image in accordance with the image data from the image reading unit, a first circuit for permitting the image forming unit to execute image forming in accordance with image data acquired by a forward movement of the scanner in the image reading unit, and a second circuit for permitting the image forming unit to execute image forming in accordance with image data acquired by a return movement of the scanner in the image reading unit. The first and second circuits thus permit the image forming unit to carry out image forming in the return movement as well as the forward movement of the scanner of the image reading unit.

17 Claims, 15 Drawing Sheets

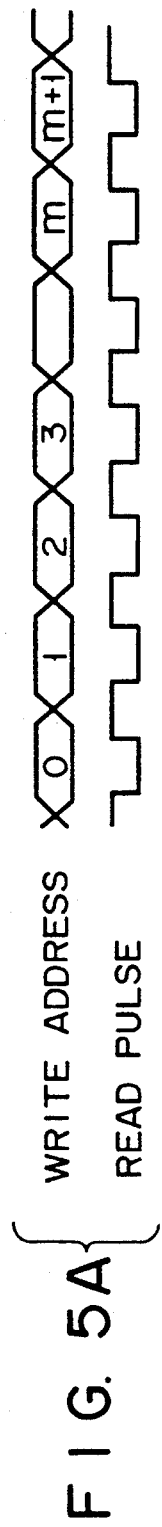
FIG. 5A { WRITE ADDRESS / READ PULSE
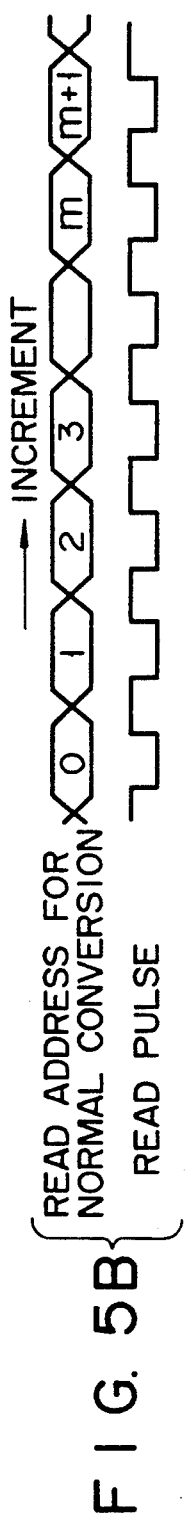
FIG. 5B { READ ADDRESS FOR NORMAL CONVERSION / READ PULSE
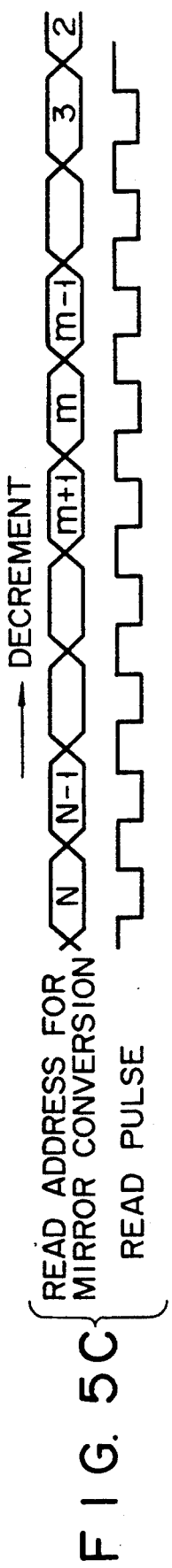
FIG. 5C { READ ADDRESS FOR MIRROR CONVERSION / READ PULSE

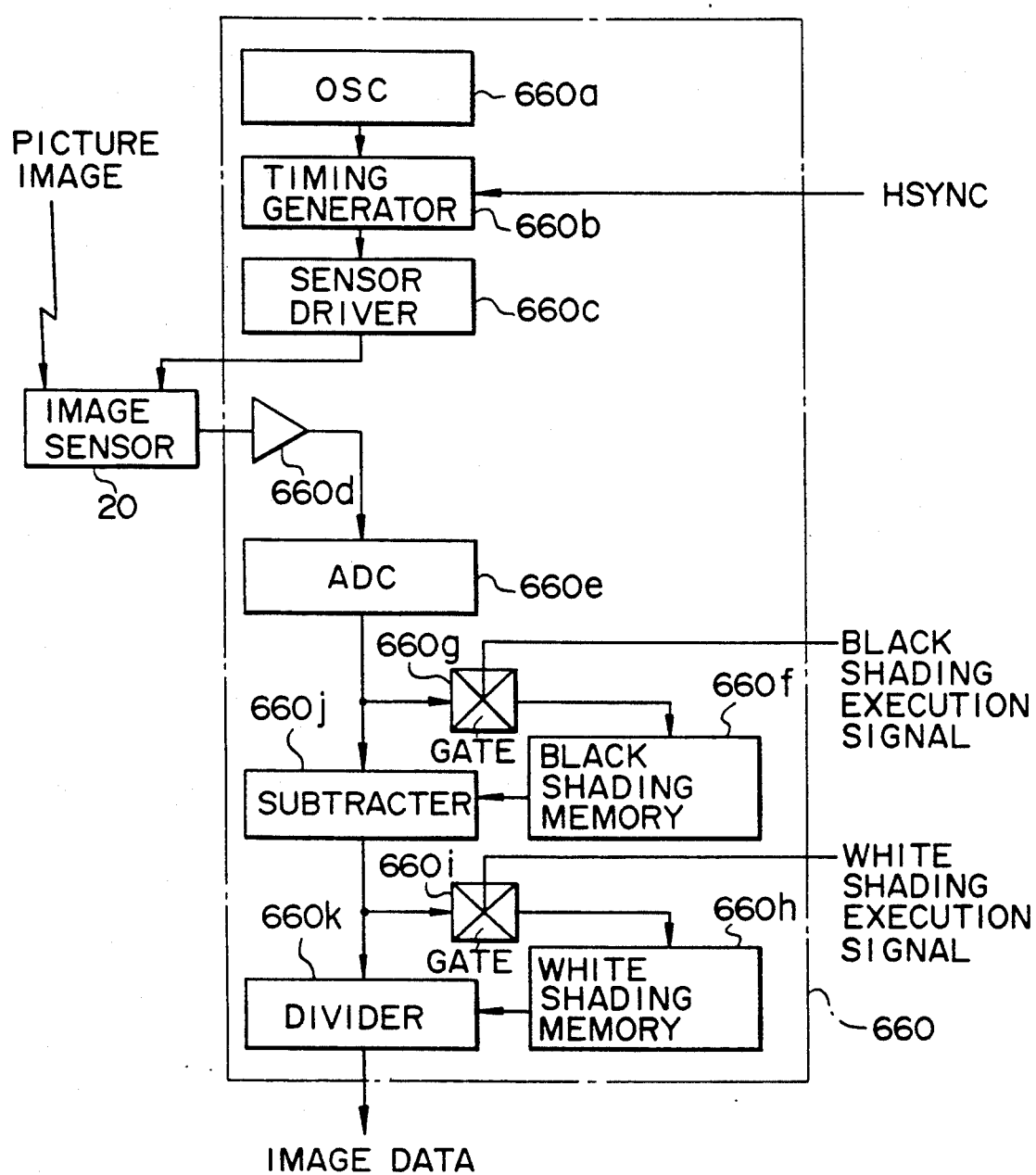
F I G. 7

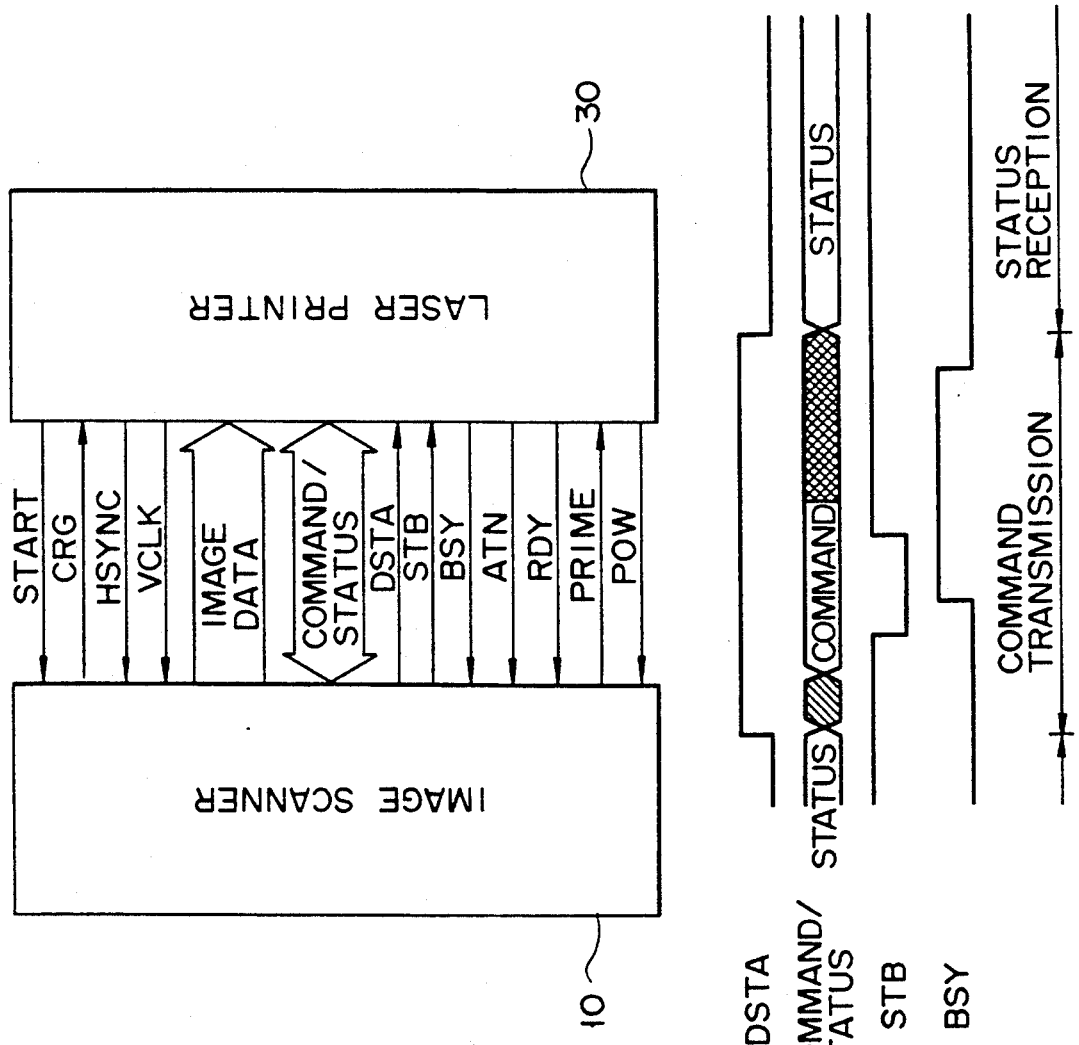

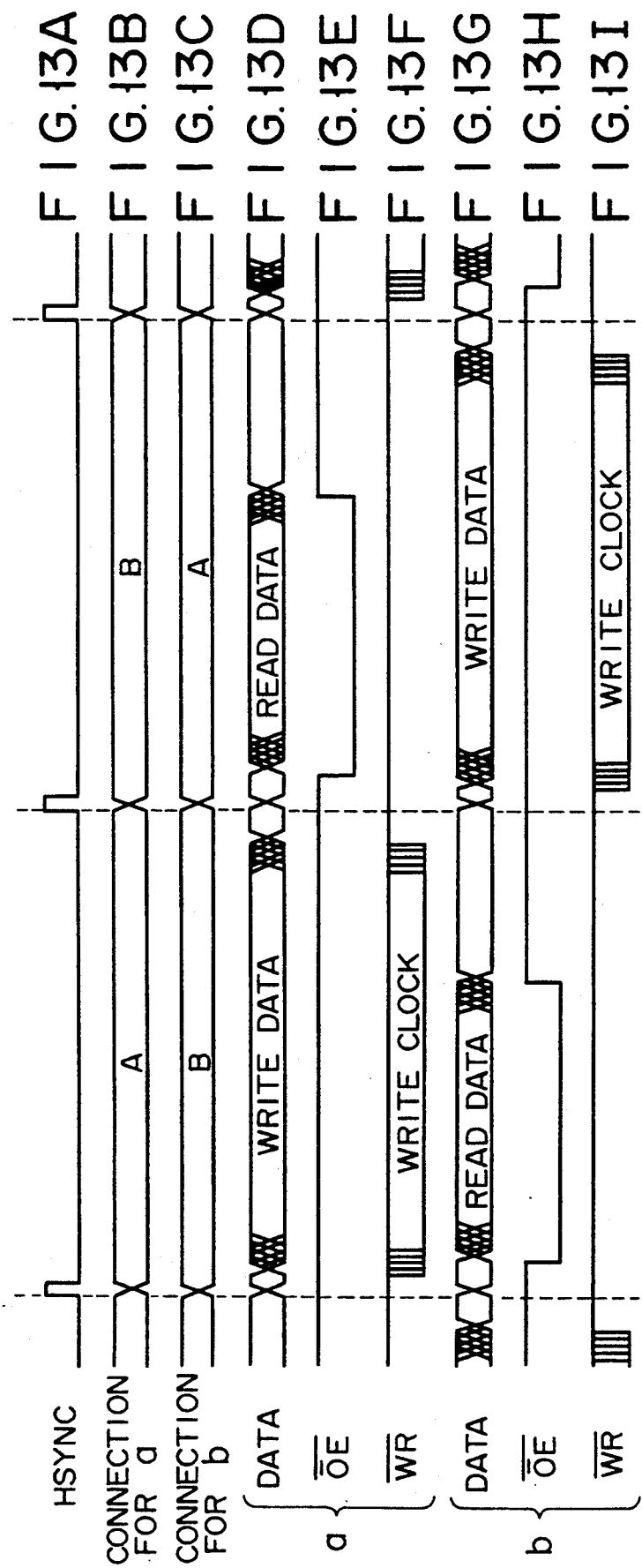

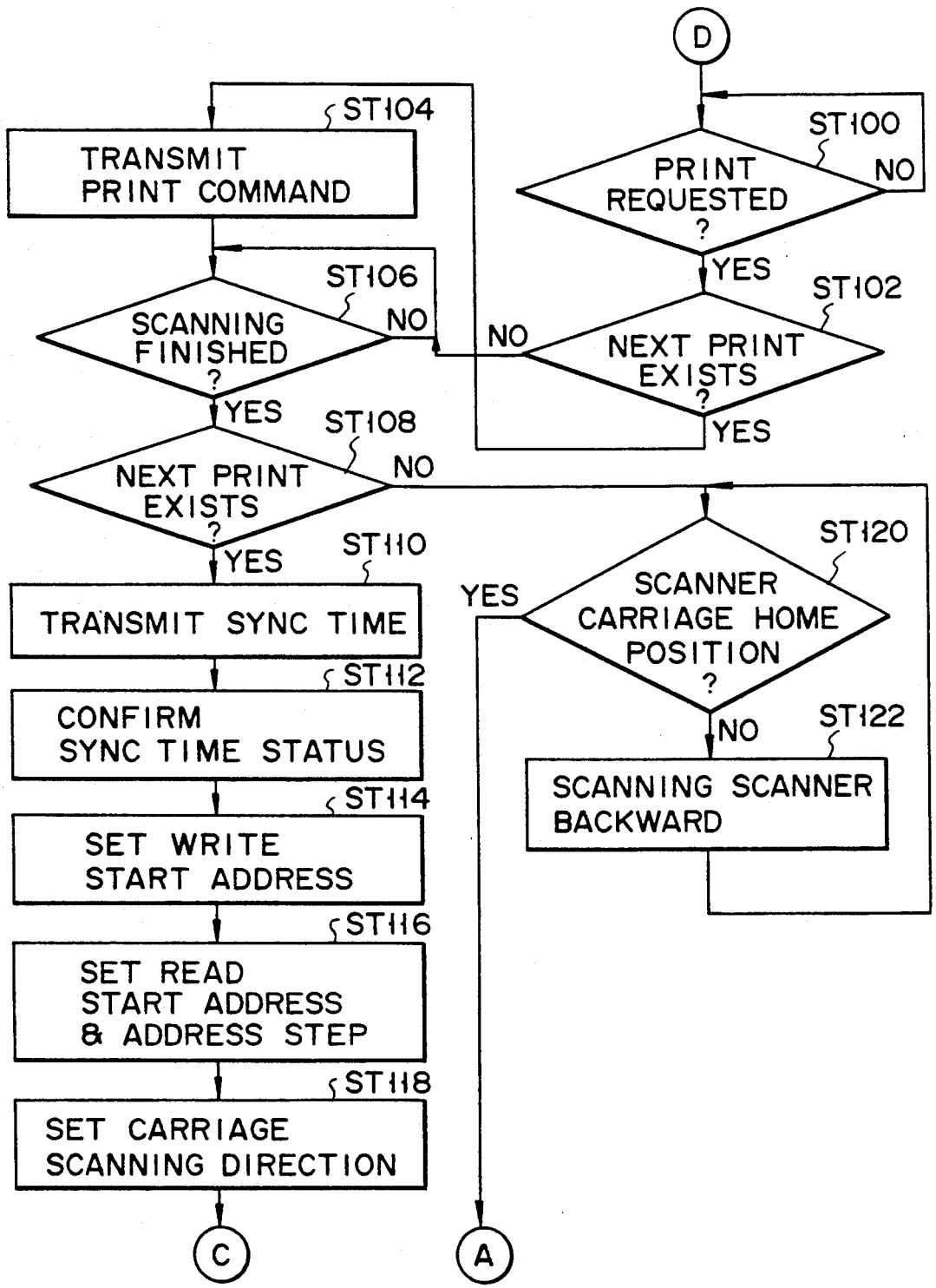
F I G. 14D

IMAGE FORMING APPARATUS WITH IMPROVED IMAGE FORMING SPEED

BACKGROUND OF THE INVENTION

1. Field of the Invention

The present invention relates to an image forming apparatus for use in a digital copying machine having a laser printer coupled to a scanner.

2. Description of the Related Art

Recently, digital copying machines (image forming apparatuses) put to practical use have a laser printer (image forming unit) for forming an image by an electrophotographic system, coupled to a scanner (image reading unit) for reading image data of an original as image data by moving an optical carriage (scanning means).

These types of copying machines are designed to form an image only at the time the optical carriage of the scanner moves in its forward direction. This is because also forming an image during the return movement of the optical carriage requires:

the order of reading image data by means of an image sensor disposed in the optical carriage is reversed;

the position control of the optical carriage along the subscanning direction should be executed at a high accuracy;

complex synchronization of the printing operation of the printer with the scanning operation of the scanner must be executed; and so on.

A laser printer itself is originally designed to be able to form an image at a high speed (high-speed printing) if it receives image data in rapid succession. Since a scanner involves the return operation of the optical carriage which does not contribute to image forming, however, the time required for this return operation is a bottleneck in sufficiently improving the image forming speed of a printer. With the above in mind, there is a demand for an image forming apparatus free of problems.

SUMMARY OF THE INVENTION

Accordingly, it is an object of this invention to provide an image forming apparatus which can execute image forming in an image forming unit not only in forward operation of scanning means in an image reading unit but also in the return operation thereof, thereby shortening the processing time required for consecutive image forming operations.

To achieve the above object, the image forming apparatus embodying the present invention comprises an image reading unit for reading image data with movement of scanning means, an image forming unit for forming an image in accordance with the image data from the image reading unit, first means for permitting the image forming unit to execute image forming in accordance with image data acquired by a forward movement of the scanning means in the image reading unit, and second means for permitting the image forming unit to execute image forming in accordance with image data acquired by a return movement of the scanning means in the image reading unit.

According to the present invention, the last two means permit the image forming unit to carry out image forming during the return movement, as well as during the forward movement of the scanning means of the image reading unit.

BRIEF DESCRIPTION OF THE DRAWINGS

FIG. 5A illustrates the relation between a write address and a read pulse;

FIG. 5B illustrates the relation between a read address and a read pulse wherein image forming is performed with a normal conversion (1:1 conversion);

FIG. 5C illustrates the relation between a read address and a read pulse wherein image forming is performed with a mirror conversion;

FIG. 7 is a block diagram of read data processor 660 shown in FIG. 2;

FIG. 9 shows an example of the interface between image scanner 10 and laser printer 30;

FIGS. 10A-10E illustrate the timing of command and status transmitted between and received by the scanner and the printer;

FIGS. 13A-13I are timing charts showing the operation of gate circuit 663 shown in FIG. 2; and FIGS. 14A-14D are flow charts exemplifying the operation of CPUs 60/70 shown in FIG. 1.

DETAILED DESCRIPTION OF THE PREFERRED EMBODIMENTS

A preferred embodiment of the present invention will now be described referring to the accompanying drawings.

Figure 12:
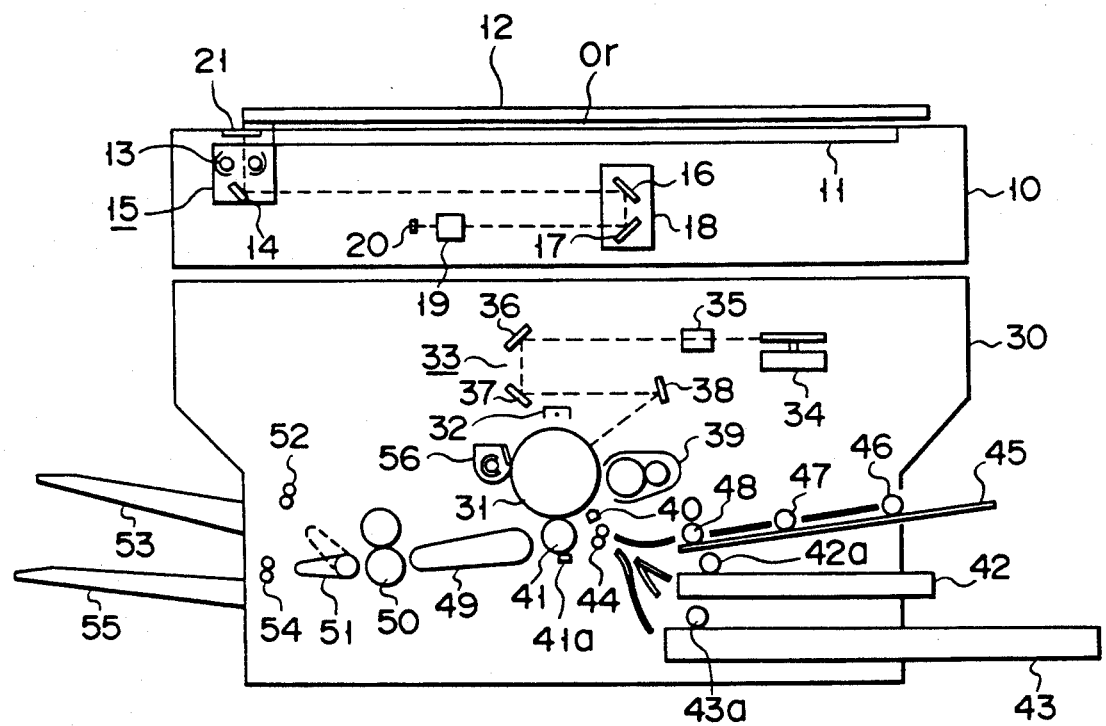
FIG. 12 schematically shows the configuration of a digital copying machine to which the present invention is applied.

FIG. 12 illustrates a digital copying machine, which comprises a laser printer (image forming unit) 30 of, for example, an electrophotographic type, and a scanner (image reading unit) 10, as an example of an image forming apparatus according to this invention. According to this copying machine, the laser printer 30 is electrically coupled via an interface cable or the like to the scanner 10 so that the printer 30 forms (prints) an image in accordance with image data coming from the scanner 10.

The scanner 10 comprises an original stand (of transparent glass) 11 on which an original Or is to be placed, an original cover 12 openable/closeable to the original stand 11, an optical carriage (scanning means) 15 disposed to face these two units, a subcarriage 18, a lens 19, an image sensor 20, and a driving system (not shown) for changing the positions of the individual units mentioned above. The optical carriage 15 has an illumination lamp 13 serving to irradiate light on the original Or and a first mirror 14 for receiving light reflected from the original Or. The subcarriage 18 has second and third mirrors 16 and 17 serving to alter the direction of light from the optical carriage 15 by 180°. The lens 19 collects or condenses the reflected light coming from the original Or via the subcarriage 18. The image sensor 20 performs photoelectric conversion of the light condensed by the lens 19 to read image data.

A shading correction board 21, which is a white reference board for shading correction to be described later, is disposed at the proximity of that portion of the original stand 11 which faces the initial or home position of the optical carriage 15.

An image of the original Or is read by the image sensor 20 by reciprocating the optical carriage 15 along the bottom of the original stand 11 in the subscanning direction (horizontal direction in the diagram) by a distance corresponding to the size of the original Or.

The laser printer 30 comprises a photosensitive drum, a charger 32, a laser optical system 33, a developing unit 39, a de-electrifying lamp 40 for de-electrification prior to image transfer, a transfer roller 41 and a cleaning unit 56; the last six units 32–56 are sequentially disposed around the drum along the rotational direction. The transfer roller 41 is provided with a blade 41a for scraping adhered toners off the roller 41.

The laser optical system 33 comprises a semiconductor laser diode (78 in FIG. 1) for generating a laser beam modulated according to dot image data; a collimator lens (not shown) for providing parallel beams from the laser beam from the laser diode; a rotational mirror (polygon mirror) 34 for scanning the output light of the collimator lens; a lens 35 having the functions of both a fθ lens for making the scanning speed on the photosensitive drum 31 constant and a correction lens for correcting surface discrepancy, reflectors 36, 37 and 38 for reflecting the laser beam passing through the lens 35 toward the photosensitive drum 31.

Feed cassettes 42 and 43 are detachably set in one side of the printer 30, and sheets of paper in these cassettes are to be fed out by feed rollers 42a and 43a, respectively. A pair of aligning rollers 44 are disposed downstream of the feed rollers 42a and 43a to feed sheets from the feed cassettes 42 and 43 at the proper timing onto a toner image formed on the surface of the photosensitive drum 31. A manual feed stand 45 for manually feeding a sheet of paper is provided above the upper feed cassette 42. Above this manual feeding stand 45 are manual rollers 46, 47 and 48 disposed in the named order to feed the manually inserted paper to where the aligning roller pair 44 are located.

In the downstream of an image transfer section between the photosensitive drum 31 and transfer roller 41 are disposed a sheet feeding path 49 extending through the image transfer section, a pair of heat rollers so serving as a fixing unit, a discharge selector 51, and two pairs of discharge rollers 52, 54. Two discharge trays 53 and 55 are provided on the other side of the printer 30. The former tray 53 receives papers distributed by the discharge selector 51, then discharged by the discharge roller pair 52. The latter tray 55 receives paper discharged by the discharge roller pair 54, paper distribution in this direction being selected also by the selector 51.

With the above arrangement, in performing a printing operation, first, the photosensitive drum 31 is rotated while the charger 32 is activated to uniformly charge the surface of this drum 31, then exposure associated with dot image data is executed on the drum 31 by the laser optical system 33 to form an electrostatic latent image on the drum. The latent image on the photosensitive drum 31 is developed to form a toner image by the developing unit 39, which uses a two-component developer consisting of a toner and a carrier. After the surface potential of the photosensitive drum 31 is removed by the de-electrifying lamp 40 for easy transfer of the toner image, this toner image is sent to the image transfer section.

Paper selectively supplied from the feed cassettes 42, 43 in synchronization with the toner image forming operation or the one manually supplied from the manual feeding stand 45 is fed out through the aligning roller pair 44, and the toner image on the photosensitive drum 31 is transferred onto the paper by means of the transfer roller 41.

The paper with the transferred toner image is sent through the sheet feeding path 49 to the heat roller pair 50, which toner melts and fixes the toner image on the paper passing through the rollers. The image-fixed paper is then distributed to either the upper discharge tray 53 or lower discharge tray 55 by the selector 51. For instance, distribution toward the upper discharge tray 53 is selected for the paper having a image formed in accordance with image data acquired when the optical carriage 15 of the scanner 10 scans the original Or from left to right in FIG. 12 (at the time of the forward operation), while distribution toward the lower tray 55 is selected for the paper having an image formed in accordance with image data acquired when the optical carriage 15 scans the original Or from right to left (at the time of the return operation).

The photosensitive drum 31, after transfer of the toner image on paper, has the residual toners on its surface cleaned off by the cleaning unit 56, and becomes ready for the next print operation.

Figure 1:
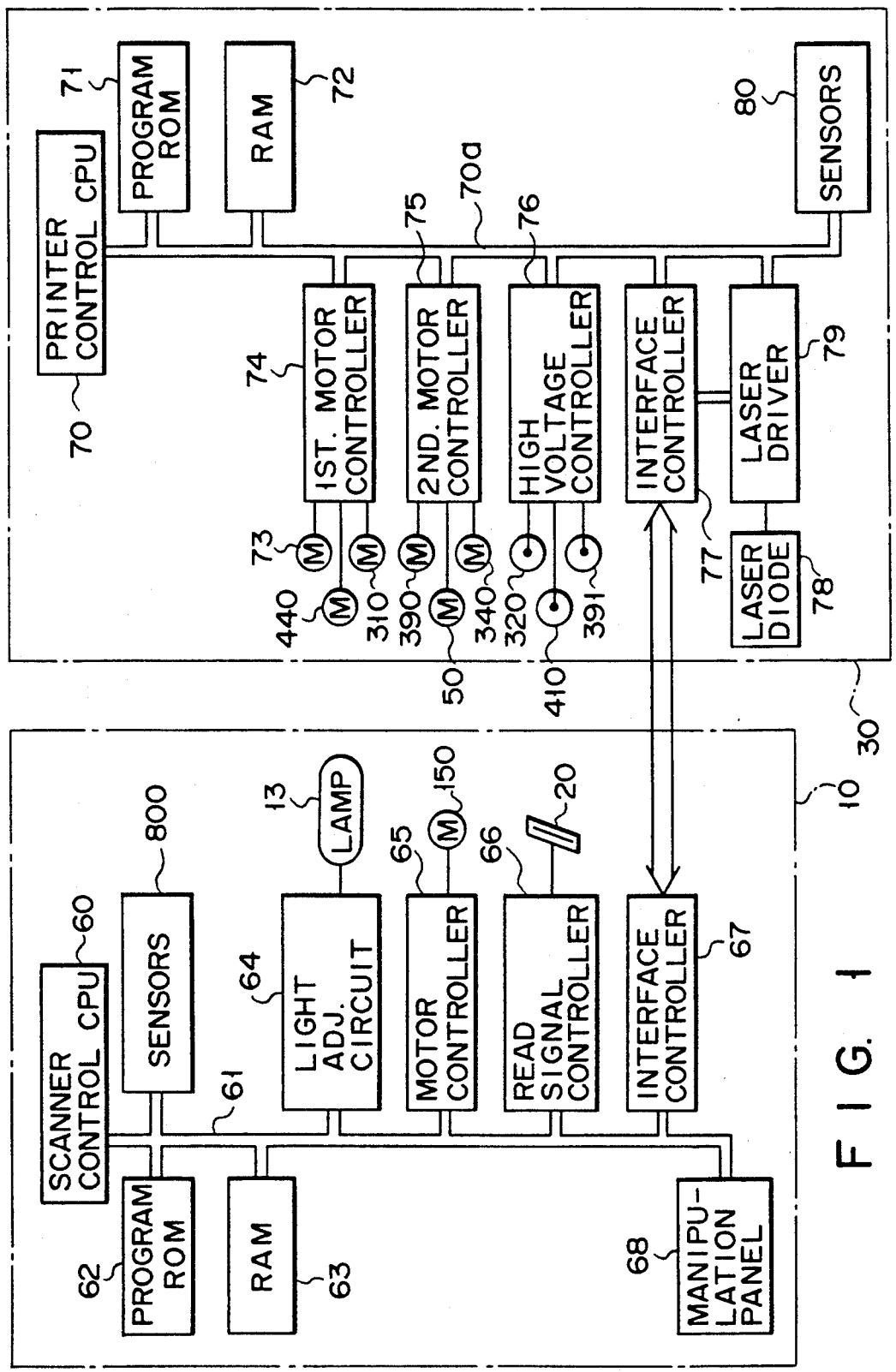
FIG. 1 is a block diagram schematically showing the electronic circuit of an image forming apparatus (laser printer) according to a embodiment of the present invention.

FIG. 1 illustrates the electric circuit of a thus constituted copying machine. Reference numeral 60 in the scanner 10 denotes a CPU (Central Processing Unit) which performs the general control of the scanner. This CPU 10 is coupled through a CPU bus 61 with a control program ROM (Read Only Memory) 62, a RAM (Random Access Memory) 63 storing the amount of movement (the number of steps) of the optical carriage 15 according to the size of the original Or, etc., a light adjusting circuit 64 for controlling the ON/OFF of the illumination lamp 13 and the amount of exposing light from the lamp 13, a motor controller 65 for controlling a driving motor (e.g., a pulse motor) 150 for moving the optical carriage 15, a read signal controller 66 for driving and controlling the image sensor 20, an interface controller 67 for connecting the scanner 10 to the laser printer 30, a manipulation panel 68, etc.

The CPU 60 receives various signals from various sensors 80.

In laser printer 30, reference numeral 70 is a CPU for performing the general control of the printer. This CPU 70 is coupled through a CPU bus 70a with a control program ROM 71, a RAM 72, a first motor controller 74, a second motor controller 75, a high voltage controller 76, an interface controller 77 for connecting this printer to the scanner 10, a laser driver 79 for driving the aforementioned semiconductor laser diode 78, and various sensors 80.

The first motor controller 74 controls a feed motor 73 for selectively driving the feed rollers 42a and 43a, a resist motor 440 for selectively driving the aligning roller pair 44 and manual rollers 46-48, and a drum motor 310 for rotating the photosensitive drum 31. Due to frequent forward/reverse rotation as well as a frequent stop, pulse motors are mainly used as the motors 73, 440 and 310.

The second motor controller 75 controls a developing motor 390 for driving the developing unit 39, a motor for driving the heat roller pair 50, and a polygon motor 340 for rotating the rotational mirror 34. A Hall IC motor rotatable at a constant velocity is mainly used for each of the motors 390 and 340.

The high voltage controller 76 controls a high voltage transformer 320 for driving the charger 32, a high voltage source 410 for driving the transfer roller 41 for image transfer, and a developing bias 391 of the developing unit 39.

Figure 2:
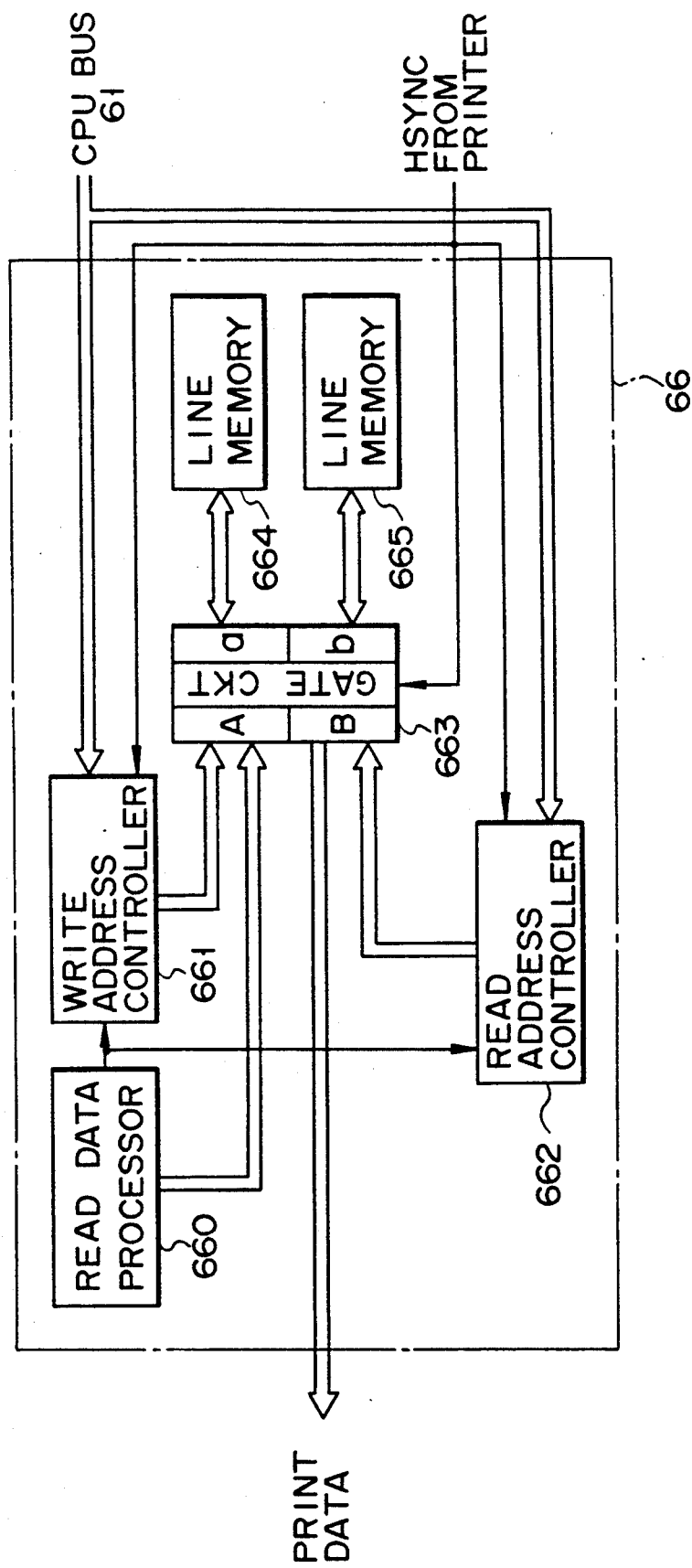
FIG. 2 is a block diagram of read signal controller 66 shown in FIG. 1.

FIG. 2 illustrates the arrangement of the read signal controller 66. This controller 66 comprises a read data processor 660, a write address controller 661, a read address controller 662, a gate circuit 663 and two line memories 664 and 665.

Referring to FIG. 2, upon reception of an HSYNC signal (line sync signal) from the printer 30, the read signal controller 66 switches the connection between gates A and B and gates a and b of the gate circuit 663. For instance, with the gates A and a being connected together and the gates B and b being connected together, image data supplied through the read data processor 660 from the image sensor 20 is written in the line memory 664.

The gate circuit 663 operates in such a way that the gates a and b are alternately switched (FIGS. 15B and 15C) in synchronization with the timing of generating the HSYNC signal (FIG. 13A). In this case, data, an output enable signal $\overline{OE}$ and a write clock $\overline{WR}$, all from the gate a, are as shown in FIGS. 13D—13F, while data, an output enable signal $\overline{OE}$ and a write clock $\overline{WR}$, all from the gate b, are as shown in FIGS. 13G–13I. Address control of the line memory 664 is executed by the write address controller 661.

Figure 3:
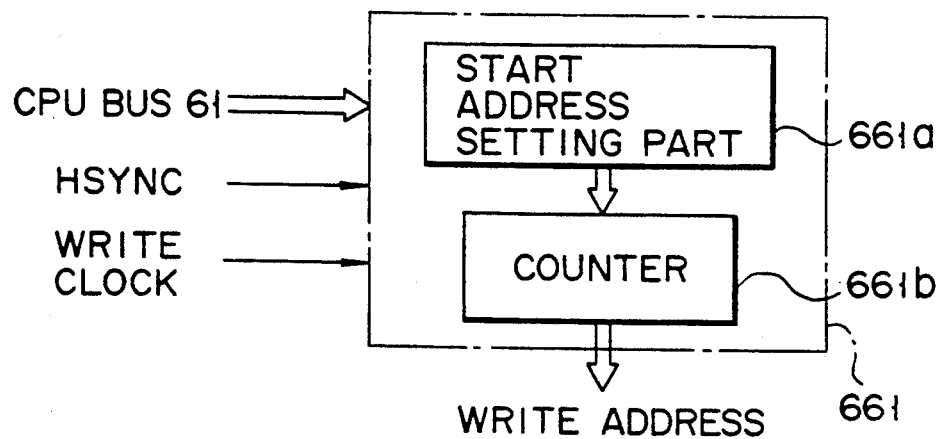
FIG. 3 is a block diagram of write address controller 661 shown in FIG. 2.

More specifically, as shown in FIG. 3 a start address is set in a start address setting part 661a of the write address controller 661 by the CPU 60 of the scanner 10, and a counter 661b is up-counted by a step width of 1 from the start address. The count-up operation is executed in synchronization with a write clock (write pulse) supplied for each pixel from a timing generator (to be described later) in the read data processor 660.

Upon completion of data reading for one line, the connection between the gates in the gate circuit 663 is switched to connect the gates A and b and the gates B and a by the line sync signal (HSYNC signal) for the printer 30. The gate switching permits image data supplied through the read data processor 660 from the image sensor 20 into the line memory 665. At this time, address control of the line memory 665 is also done by the write address controller 661.

Image data in the line memory 664 is read out through the gate circuit 663 as print data (bit image data) to the printer 30. Address control of the line memory 664 in this case is executed by the read address controller 662.

Figure 4:
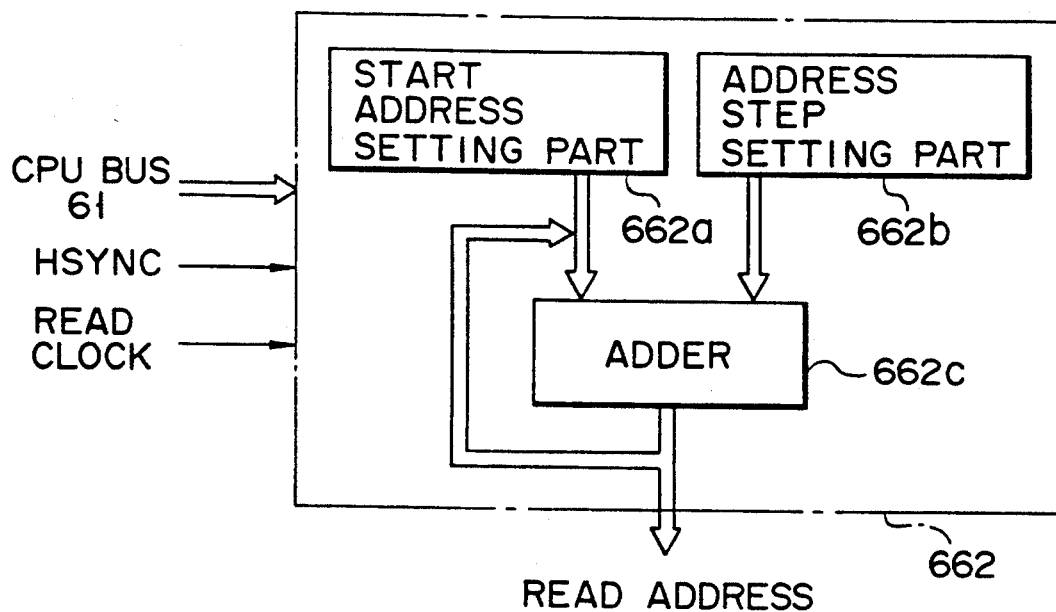
FIG. 4 is a block diagram of read address controller 662 shown in FIG. 2.

More specifically, a start address and an address step are respectively set in a start address setting part 662a and a address step setting part 662b of the read address controller 662 by the CPU 60 of the scanner 10, as shown in FIG. 4. The value of an adder 662c is incremented from this start address by the set step width for each read clock. In this case, provided that the start address is "0" and the step width is "1", the value of the adder 662c varies from "0" to "4676" by a step width of "1" (this copying procedure corresponds to the resolution of 400 dpi for the size of A3 in this embodiment).

Since the read address controller 662 is constituted by an adder, it has a function which the write address controller 661 does not have. Given that the address step is a number including a decimal point smaller than "1," the address of only an integer portion is to be output, but a decimal part is computed in the read address controller 662. In this case, it is possible to repeatedly output the same address, thus ensuring an enlarged copy.

With the address step being greater than "1," a reduced copy is provided.

In the case of making a reduced copy with the address step greater than "1," the address output during copying may overflow the writing range of the line memories 664 and 665. In such a case, however, no problem will arise if data read out from the line memories 664 and 665 is treated as non-print data.

If the start address is the normal last address and the address step is a negative number, data will be read out in the reverse order from the line memories 664 and 665. This can provide a normal image obtained by mirror-inverting a proper image to be upside down. This function of reading data in the reverse order from the line memories 664 and 665 ensure image forming even in the return movement of the optical carriage 15.

FIGS. 5A through 5C respectively exemplify a write address and a read pulse, a read address for equal magnification or normal conversion, and a read address for mirror inversion in the read signal controller 66.

Figure 6A:
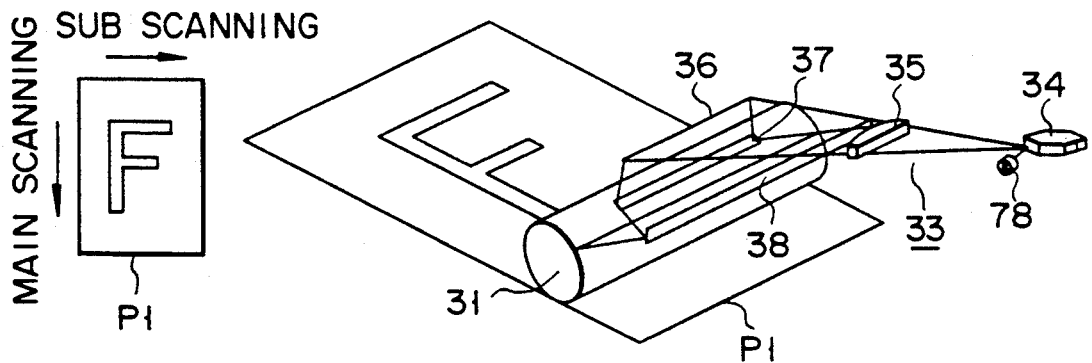
FIG. 6A illustrates how forward scanning is performed to form a normal image in a laser printer.
Figure 6B:
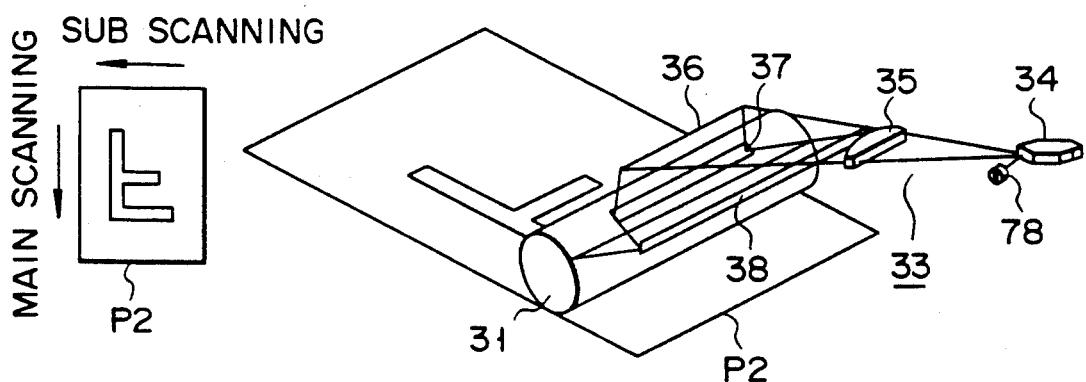
FIG. 6B illustrates how backward scanning is performed to produce a mirror image in the laser printer.
Figure 6C:
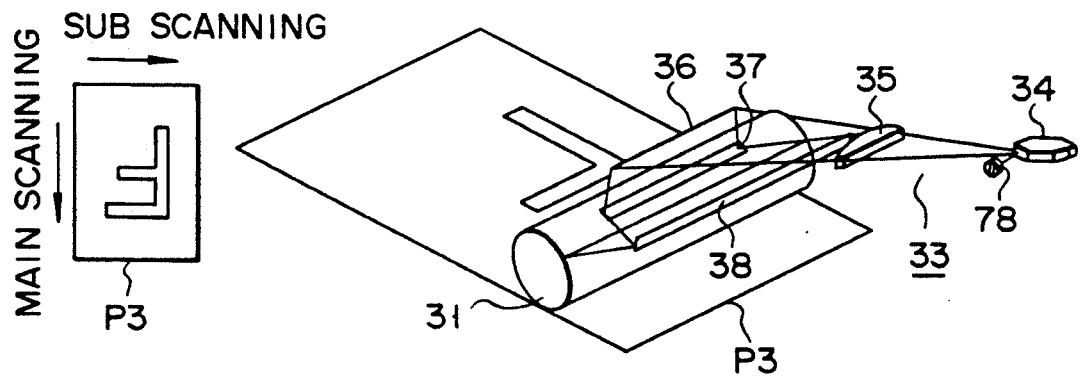
FIG. 6C illustrates how backward scanning is performed to produce a normal image in the laser printer.

FIGS. 6A through 6C exemplify the scanning directions of the original Or by the optical carriage 15 of the scanner 10 and images formed by the scanning in these directions.

FIG. 6A illustrates how an image is formed on paper $P_1$ when the original Or is scanned by the optical carriage 15 in the forward direction from left to right in FIG. 12. FIGS. 6B and 6C respectively illustrate how an image is formed on papers $P_2$ and $P_3$ when the original Or is scanned by the optical carriage 15 in the return or backward direction from right to left.

If image data in the line memories 664 and 665 shown in FIG. 2 is read out in the same manner as is in the forward scanning shown in FIG. 6A, an image is formed as shown in FIG. 6B. In other words, if the original Or is scanned by the optical carriage 15 in the backward direction and image data obtained by this scanning is read out from the memories 664 and 665 in the same manner as done for the case of forward scanning of the optical carriage 15, an image formed on paper $P_2$ is the proper image which is mirror-inverted to have its right side left. This image forming is not practical unless such a right-side-left image is desired.

With the use of the aforementioned function of the read address controller 662 to read data from the line memories 664 and 665 in the reverse order, therefore, when the optical carriage 15 scans the original Or in the forward direction from right to left, data is read out from the line memories 664 and 665 in the reverse order of what is actually done in the forward scanning of the optical carriage 15. This feature can provide a normal image shown in FIG. 6C as per the case shown in FIG. 6A. Although the resultant image is the top-side-down version of the image shown in FIG. 6A, they are the same image (normal image).

If an image is to be continuously formed on a plurality of papers, the copies would include papers $P_1$ having the proper image as shown in FIG. 6A and papers $P_3$ having the mirror-converted, top-side down image as shown in FIG. 6C. This is likely to cause inconvenience in arranging the image-printed papers. To avoid such inconvenience, the two types of image-formed papers $P_1$ and $P_3$ are separately discharged on the associated trays 53 and 55, the papers with the proper image on one tray and the papers with the top-side down image on the other. In this case, discharging the papers ($P_1$) with the proper image on the upper tray 53 permits a user to easily confirm how the image is actually formed.

FIG. 7 illustrates the arrangement of the read data processor 660 (a peripheral circuit of the image sensor 20).

Referring to FIG. 7, a timing generator 660b generates various signals (including a read clock) for operating the image sensor 20 in accordance with the pulse from an oscillator 660a in synchronization with the HSYNC signal from the printer 30. These generated signals are amplified to be large-capacity signals by a sensor driver (CCD driver) 660c, then used to drive the image sensor 20. An analog signal from thus driven image sensor 20 is amplified to have a several times greater voltage value by an amplifier 660d, and is converted into a digital signal by an A/D converter 660e. The timing generator 660b generates various signals to the read signal controller 66, such as a write clock for the line memories 664 and 665.

A black shading memory 660f stores a signal read when the illumination lamp 13 mounted in the optical carriage 15 is not ON, as an offset value for the image sensor 20. At the time the signal is stored in the memory 660f, a gate 660g is opened by a black shading execution signal from the CPU 60.

A white shading memory 660h stores a signal obtained by subtracting, in a subtracter 660j, the black shading value from a signal read when, with the illumination lamp 13 being turned ON by the CPU 60, the optical carriage 15 is set to face the shading correction board 21 as a white reference board. This white shading value, which is data for correcting uneven exposure of the lamp 13 and variation in sensitivity of the image sensor 20, is stored in the memory 660h by opening a gate 660i by a white shading execution signal.

Scanning the original Or will now be described. The optical carriage 15 normally remains stopped at a home position to face the shading correction board 21, and starts scanning the original Or when the black shading value is stored in the memory 660f and the white shading value in the memory 660h. The black shading value is subtracted from the digital value converted by the A/D converter 660e from the analog signal picked up by the image sensor 20 to correct an offset of the sensor 20. The resultant signal is further divided by the white shading value by a divider 660k to correct uneven exposure of the lamp 13 and a variation in sensitivity of the sensor 20. The image data acquired through the above signal processing is transferred through the gate circuit 663 to the line memories 664 and 665, as described earlier.

The black shading value is stored in the memory 660f one at the beginning of an image forming operation, while the white shading value is stored in the memory 660h every time the original is scanned by the optical carriage 15. In view of a small change, if any, in the amount of light from the lamp 13 and in sensitivity of the image sensor 20 in a short period of time, rewriting the content of the white shading memory 660h in the backward scanning of the optical carriage 15 is omitted in this embodiment. In other words, rewriting the content of the memory 660h is performed only at the beginning of the forward scanning of the optical carriage 15. This eliminates the need to provide a shading correction board on that side where the backward scanning starts (on the right side in FIG. 12), reducing the necessary space and simplifying the image forming operation.

Figure 8:
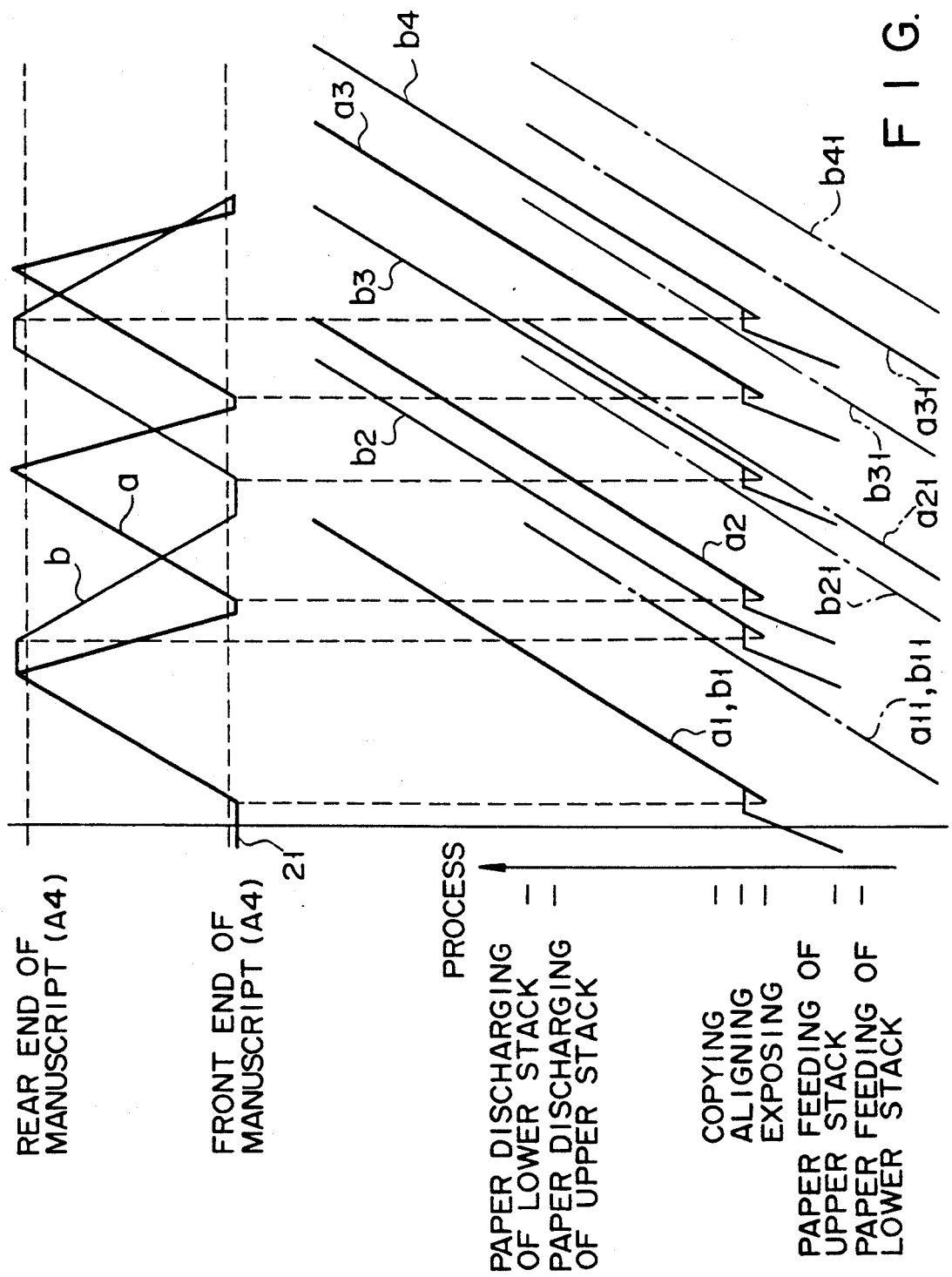
FIG. 8 illustrates the relation between the action of an optical carriage and an image forming operation.

FIG. 8 is a diagram illustrating the relation between the movement of the optical carriage 15 of the scanner 10 and the image forming operation of the laser printer 30. The top portion of the diagram illustrates the movement of the optical carriage 15, and the bottom portion the movements of the fore end (solid line) and rear end (one-dot chain line) of paper P in the shading correction board 21.

The thick lines (a) in the diagram show the movements of the optical carriage 15 and paper P in a case where image forming is executed only when the optical carriage 15 scans the original in the forward direction (scanning from left to right). The thin lines b ($a_1$ and $b_1$ are the same for the first paper P, so are $a_{11}$ and $b_{11}$) show the movements when image forming is executed not only in the forward scanning but also in the backward scanning of the optical carriage 15.

In FIG. 8, $a_1$ and $b_1$ indicate the fore ends of the first paper P, while $a_{11}$ and $b_{11}$ indicate the rear ends of this paper, $a_2$ and $b_2$ indicate the fore ends of the second paper P while $a_{2a}$ and $b_{21}$ indicate the rear ends of this paper, $a_3$ and $b_3$ indicate the fore ends of the third paper P, while $a_{31}$ and $b_{31}$ indicate the rear ends of this paper, and $a_4$ and $b_4$ indicate the fore ends of the second paper P while $a_{41}$ and $b_{41}$ indicate the rear ends of this paper.

It should be understood from the top part of FIG. 8, in a period in which only three copies in A4 size are obtained by the image forming system that forms an image only in the forward scanning, about four copies can be made by the image forming system that forms an image both in the forward scanning and backward scanning. According to the present embodiment, the copying speed can be improved to provide 38 copies in a certain period of time whereas 30 copies are made by a conventional apparatus whose image forming operation involves only the forward scanning FIG. 9 illustrates interface signals exchanged between the laser printer 30 and scanner 10.

A line for transferring a command/status is of an 8-bit bus type, and is selectively used for the command and status by a DSTA signal from the scanner 10.

There are 8 lines for transferring image data. The number of the lines can vary depending on the number of gradations of image data; in this embodiment, there are 256 gradations per pixel and image data for one pixel is transferred for each clock. A single line may be sufficient for two gradations; however, if multi-pixel data is to be transferred per clock even in the case involving two gradations, it is necessary to provide the corresponding number of data lines.

START is a signal output to the scanner 10 from the printer 30 to instruct the optical carriage 15 to start operating.

CRG is a signal indicating that scanner 10 has started moving the optical carriage 15 according to the START signal.

HSYNC is a signal output from the printer 30 after disabling the START signal, according to the CRG signal.

VCLK is a signal output from the printer 30 to the scanner 10 to request the transferring of image data. The scanner 10, in turn, transfers image data on the VCLK signal to the printer 30.

DSTA is a signal to set the command/status bus for a command when the scanner 10 sends the command to the printer 30.

STB is a signal indicating that command data has been sent.

BSY is a signal acknowledging that command data has been received. This BSY signal is reset or returned to its original state, when a status associated with the result of interpretation of the command data is prepared.

ATN is a signal informing the scanner 10 that the basic status of the printer 30 has changed.

RDY is a signal indicating that the printer 30 is ready.

PRIME is a signal from the scanner 10 requesting the initialization of the printer 30.

POW is a signal indicating that power is supplied to the printer 30.

FIGS. 10A through 10E illustrate the timing at which the individual signals, command and status are exchanged between the laser printer 30 and the scanner 10. To send a command to the printer 30, the scanner 10 outputs the DSTA signal to set the command/status bus ready in advance for the command, and sends command data on the bus, then outputs the STB signal to inform the destination (printer 30) of the command data having been sent. In response to this STB signal, the printer 30 sends the BSY signal to the scanner 10 to inform that it has received the command data, interprets the command, then resets the BSY signal after preparing a status associated with the interpretation. In response to the BSY signal being reset, the scanner 10 resets the DSTA signal and loads the status from the printer 30.

Figure 11:
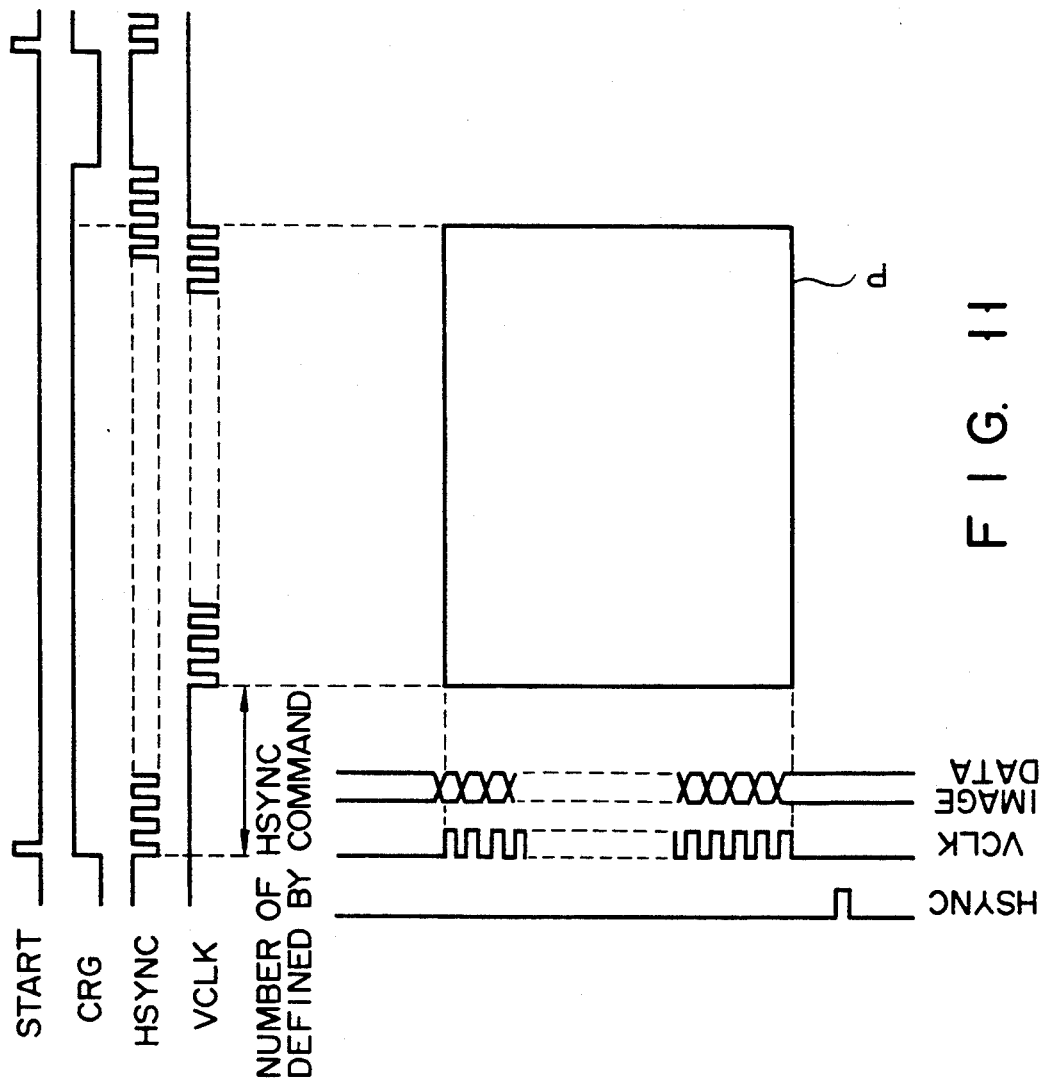
FIG. 11 illustrates the timing of image data transmitted between and received by the scanner and the printer.

FIG. 11 illustrates the statuses of the individual signals at the time image data is transferred.

When the printer 30 finishes paper feed from the cassette 42 or 43 or the manual feeding stand 45 to the aligning roller pair 44 and becomes ready for synchronization with the scanner 10, it sets the START signal ON, requesting the scanner 10 to start moving the optical carriage 15. When the scanner 10 starts moving the optical carriage 15 in response to the START signal and sets the CRG signal ON, the printer 30 resets the START signal and sends the HSYNC signal. In this case, when the time specified by the scanner 10 and required for synchronization therewith elapses, the printer 30 sends the VCLK signal to the scanner 10 requesting the transfer of image data. Then, the scanner 10 transfers the requested image data on this VCLK signal to the printer 30.

According to this embodiment, the time required for synchronization with the scanner 10 is represented by the number of HSYNC signals to be sent to the scanner 10 from the printer 30. Accordingly, the printer 30 internally decrements the number of the HSYNC signals and starts sending the VCLK signal when the count becomes "0."

A description will now be given of a command to be sent to the printer 30 from the scanner 10. A normal command has a one byte structure consisting of a parity bit (1 bit), a type bit (3 bits) indicating the type of a command and data bit (4 bits) representing detailed data of the command.

A sync time specifying command has consecutive 3 bytes constituting one command and has the subsequent 2 bytes, the upper and lower bytes, specifying the sync time in terms of the number of the HSYNC signals.

The operation with the above arrangement will be described below.

Assume that an original Or is placed on the original stand 11 and a start key (not shown) on the manipulation panel 68 is operated. Then, the CPU 60 of the scanner 10 computes the sync time from the copying magnification and the distance to the fore end of the original Or, and sends the result of the computation to the laser printer 30 through the interface controller 67.

In response to this action, the CPU 70 of the printer 30 controls the first motor controller 74 to drive the feed motor 73 to start feeding paper. When this paper feeding is completed and the printer 30 becomes ready for synchronization with the scanner 10, the printer 30 request the scanner 10 via the interface controller 77 to start moving the optical carriage 15. When the optical carriage 15 starts moving, the printer 30 internally counts the number of HSYNC signals to be synchronized with the scanner 10.

The scanner 10 controls the light adjusting circuit 64 to turn on the lamp 13 and controls the motor controller 65 to drive the motor 150, in accordance with a command from the printer 30. After setting the optical carriage 15 to face the shading correction board 21 and respectively setting the black and white shading values in the memories 660f and 660h, the scanner 10 starts scanning of the original Or with the optical carriage 15.

Then, image data, which has been read by the image sensor 20 in accordance with a signal sent from the printer 30 upon elapse of the time necessary for synchronization and has been subjected to correction of the offset and variation in sensitivity of the sensor 20 and correction of uneven exposure by the lamp 13 in the read signal controller 66, is transferred via the interface controller 67 to the printer 30. Upon completion of the scanning of the original Or, the optical carriage 15 is moved back to the home position.

The CPU 70 in the laser printer 30 controls the second motor controller 75, high voltage controller 76, laser driver 79, etc. to form an image on the paper P fed through the aligning roller pair 44. In this case, the image formed on the paper P is the proper image as shown in FIG. 6A. In other words, the image data sent from the scanner 10 is what has been read by the forward scanning of the original Or from left to right by the optical carriage 15, so that the normal image is formed as it is on the paper P.

The image-formed paper P is sent through the discharge selector 51 to the discharge roller pair 52, which in turn discharges the paper P on the tray 53. The above operation is for causing the laser printer 30 to form an image on a single paper P and discharge the paper.

The following describes the operation for continuously forming an image of plural sheets of paper P.

When the number of copies is set via the manipulation panel 68, the CPU 60 of the scanner 10 moves the optical carriage 15 forward as described above to scan the original Or and holds the carriage 15 at the scanning end position. During the forward movement of the optical carriage, paper feeding is started by a print command from the scanner obtained in response to a subsequent print request from the printer. When it is indicated that the fed paper has reached at the aligning roller pair 44, the CPU 60 of the scanner 10 computes the sync time from the magnification and the distance to the rear end of the original Or, and sends the computation result to the laser printer 30 via the interface controller 67.

The scanner 10 starts moving the optical carriage 15 in accordance with a signal from the printer 30 requesting the action, in the same manner as already described above. Image data, which has been read by the image sensor 20 in accordance with a signal sent from the printer 30 upon elapse of the time necessary for synchronization and has been subjected to correction of the offset and variation in sensitivity of the sensor 20 and correction of uneven exposure by the lamp 13 in the read signal controller 66, is transferred via the interface controller 67 to the printer 30.

In this case, the controller 66 reads out line-by-line image data, read by the image sensor 20 and stored in the line memories 664 and 665, in the reverse order. Therefore, an image formed on the paper P is a normal image acquired by mirror-converting the proper image to have the top side down, as shown in FIG. 6C. In other words, the image data supplied from the scanner 10 is what has been read by the backward scanning from right to left along the original stand 11 by the optical carriage 15. Accordingly, the normal image having the top side down is to be formed on the paper P.

The image-formed paper P is fed via the discharge selector 51 to the discharge roller pair 54 by which it is then discharged on the tray 55.

In the above manner, an image is formed on the set number of papers P by the forward scanning and backward scanning of the optical carriage 15, and those papers P having the image formed thereon according to the image data read in the forward scanning of the carriage 15 are discharged on the upper tray 53, while those having the image formed thereon according to the image data read in the backward scanning are discharged on the lower tray 55.

FIGS. 14A through 14D are flowcharts exemplifying the operation of the CPU60/70 used in the embodiment shown in FIG. 1.

Figure 14A:
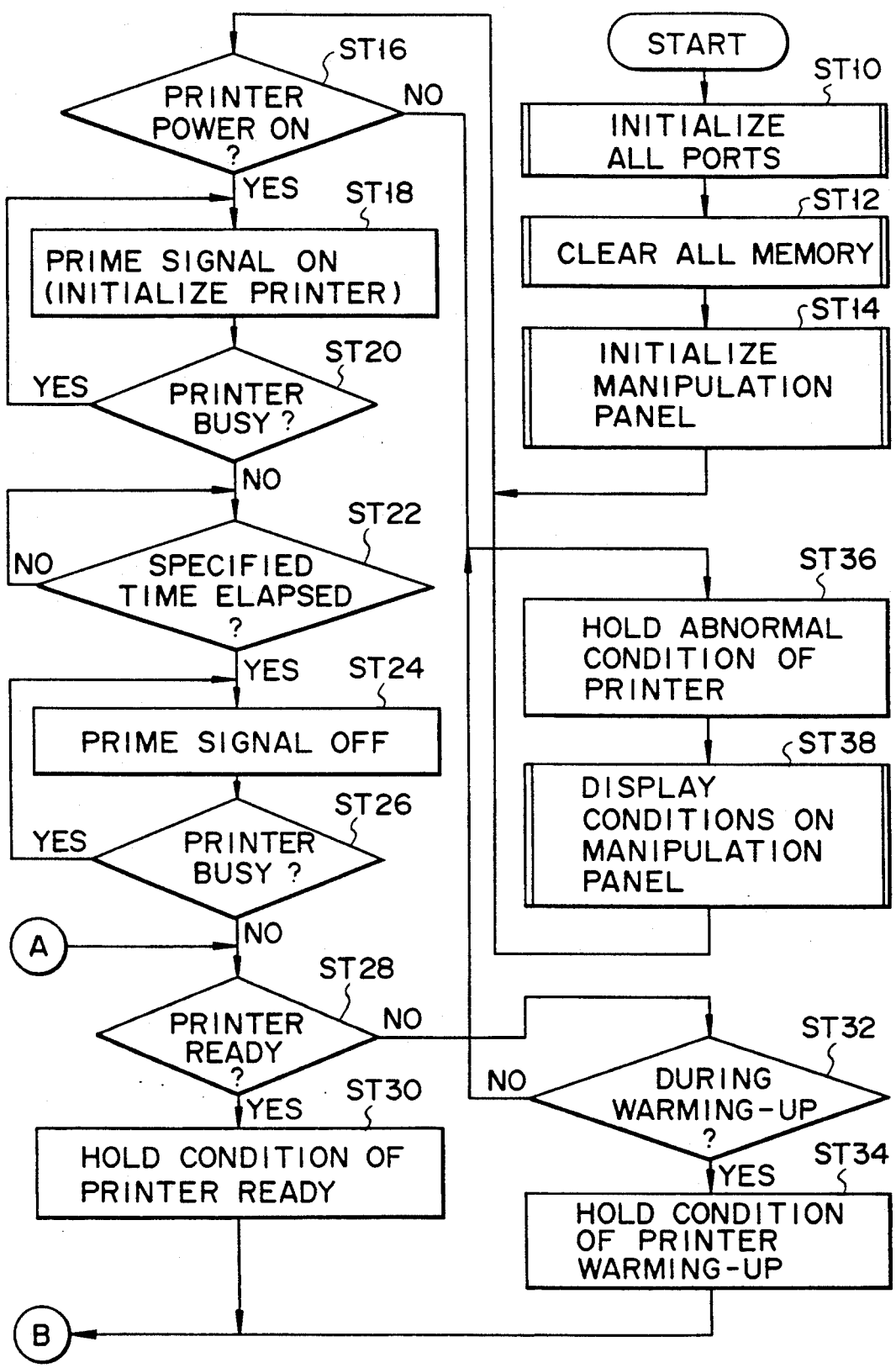

Referring to FIG. 14A, all of the ports of the scanner 10 and printer 30 are initialized (ST10), all of the memories are then cleared (ST12) and the setting of the manipulation panel is initialized (ST14).

If the power of the laser printer 30 (FIG. 1) is ON (YES in ST16), a PRIME signal to initialize the printer 30 is set ON (ST18).

If the printer 30 is not busy upon setting the PRIME signal ON (NO in ST20), the flow returns to ST18. If the printer 30 is busy (YES in ST20), it is determined whether or not a specified time has elapsed (ST22).

Upon elapse of the specified time (YES in ST22), the PRIME signal is set OFF (ST24). If the printer 30 is busy (YES in ST26), the flow returns to ST24. If the printer 30 is not busy (NO in ST26), it is determined whether or not the printer 30 is ready (ST28).

If the printer 30 is ready (YES in ST28), this status is maintained (ST30). If the printer 30 is not ready (NO in ST28), it is determined whether or not the printer is warming up (ST32).

If the printer 30 is warming up (YES in ST32), this status is maintained (ST34). If not (NO in ST32), the printer 30 is held at an abnormal status (ST36) and the flow returns to ST16 after displaying the abnormal status on the manipulation panel (ST38).

If the printer power is not ON in ST16 (NO in ST16), the processes of ST36 and ST38 will be executed.

Figure 14B:
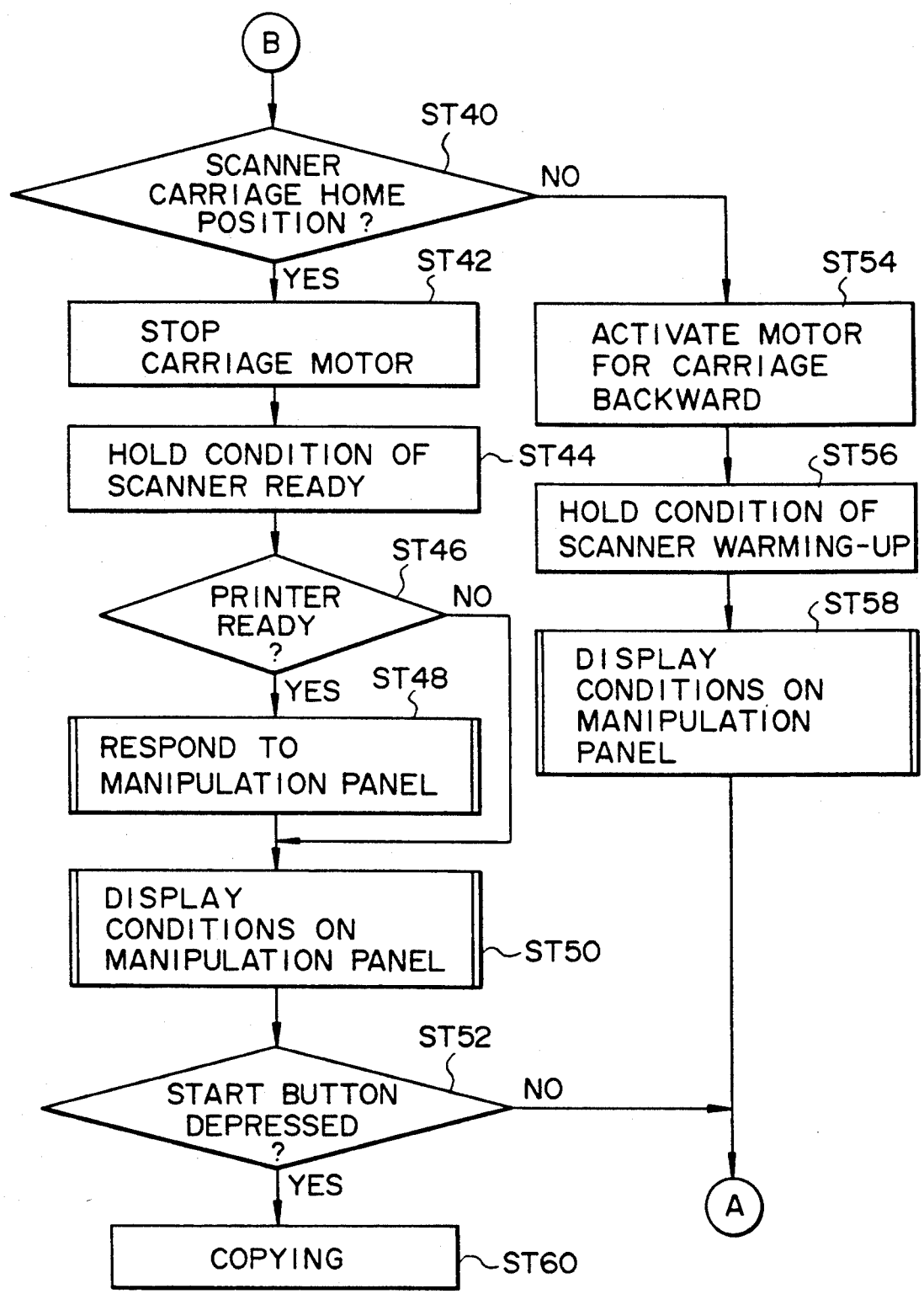

Referring to FIG. 14B, after the ready status of the printer 30 is held (ST30) or the warming-up status of the printer is held (ST34), it is checked if the scanner carriage 15 (optical carriage in FIG. 12) is at the home position or not (ST40).

If the scanner carriage 15 is at the home position (YES in ST40), the carriage motor is stopped (ST42) and the scanner ready status is held (ST44).

Then, the printer 30 is checked to determine if it is ready or not (ST46). If the printer 30 is ready (YES in ST46), an input from the manipulation panel 68 is allowed (ST48) and the input status is displayed on the panel 68 (ST50). If not (NO in ST46), the status of the printer 30 not ready is displayed on the panel 68 (ST50).

Then, if the start button (not shown) on the manipulation panel 68 is pressed, the CPU 70 is informed of this event through the sensor 80 (YES in ST52) and copying starts (ST60).

If the scanner carriage 15 is not at the home position (NO in ST40), the carriage motor is driven in the backward direction (or return direction) (ST54), the status of the scanner warming up is held (ST56), and this status is displayed on the manipulation panel 68 (ST58). After displaying the status, or if the start button is not pressed (NO in ST52), the flow returns to ST28 in FIG. 14A.

Referring to FIG. 16C, when copying starts (ST60), a write address is set by the CPU 60 at the setting part 661a shown in FIG. 3 (ST62). Subsequently, a read start address and the number of address steps are respectively set by the CPU 60 at the setting parts 662a and 662b (ST64).

Then, a predetermined printer cassette is selected in accordance with the print paper size specified through the manipulation panel 68 (ST66), and a sync time associated with the selected magnification rate is sent to the printer 30, via the interface controller 67 (ST68). Upon confirmation of the status of this sync time (ST70), the CPU 70 outputs a print command and sets the scanning direction of the carriage 15 (ST72).

Upon reception of a start signal from the printer 30 shown in FIG. 9 (YES in ST74), the CPU 60 permits the carriage 15 to start scanning and sets the CRG signal (carriage signal) ON (ST76).

Subsequently, upon reception of the HSYNC signal from the printer 30 through the interface controllers 77 and 67 (YES in ST78), the CPU 60 sets black shading data for the lamp 13 OFF into the black shading memory 6670f shown in FIG. 7 (ST80), then turns ON the lamp 13 (ST82).

If the light adjustment for the activated lamp 13 is satisfactory (YES in ST84) and the forward running of the carriage 15 is satisfactory (YES in ST86), the position of the shading board for attaining white shading data is checked (ST88). If the position of the shading board is OK (YES in ST88), the CPU 60 sets the white shading data obtained from the image sensor 20 into the white shading memory 660h (ST90).

If the light adjustment of the lamp 13 is inadequate (NO in ST84) and a specified time has elapsed under this condition (YES in ST92), the carriage 15 is stopped and the lamp 13 is turned OFF (ST94). Then, the CRG signal is set OFF (ST96) and the lamp life having expired is displayed on the manipulation panel 68 (ST98).

Figure 14C:
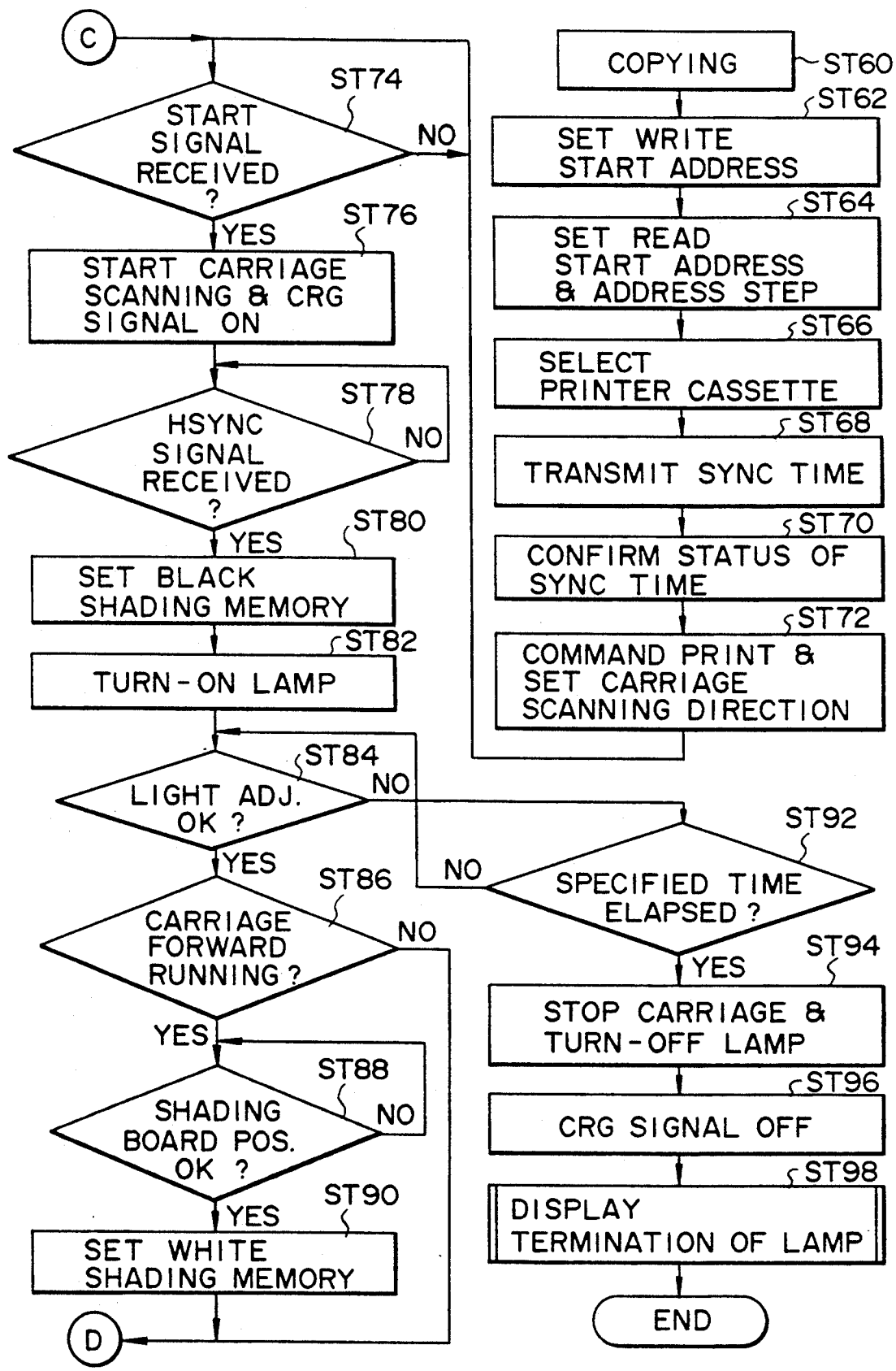

After white shading data is set in the memory 660h (ST90) in FIG. 14C, the flow advances to the processing of FIG. 14D. When a next print request is given during an image forming process by the scanner and the printer (YES in ST100) and there is the next print waiting (YES in ST102), the CPU 60 outputs a print command (ST104).

When the scanning by the carriage 15 is completed after the print command is output (YES in ST106) and there is the next print waiting (YES in ST108), the sync time is output (ST110) as is done in ST68 in FIG. 14C, and the status of this sync time is confirmed (ST112).

Thereafter, address setting similar to the one executed in ST62 and ST64 in FIG. 14C is executed (ST114, ST116), then the scanning direction of the carriage 15 is set (ST118) before the flow returns to ST74 in FIG. 14C, and subsequent image formation continues.

If the next print does not exist in ST102 (NO in ST102), the flow advances to ST106, and if there is no next print in ST108 (NO in ST108), the flow advances to ST120. If the carriage 15 is at the home position (YES in ST120), the flow returns to ST28 in FIG. 14A. If the carriage is not at the home position (NO in ST120), backward scanning is performed so that the carriage returns to the home position (ST122). Then, a stand-by condition is resumed.

As described above, according to the present invention, in forming an image based on image data read in the backward movement of the optical carriage of the scanner, data is read out from the line memories in the reverse order to provide a normal image.

That is, if image data read by the backward scanning is read out in the reverse order, a normal image can be formed even in the backward scanning of the optical carriage. This can easily improves the copying speed. In other words, the laser printer can form an image not only when the scanner performs the forward scanning but also the backward scanning, thus shortening the time required for image forming involved in consecutive image forming operations.

The present invention is in no way restricted to the particular embodiment described above, but may be modified in various manners within the scope and spirit of the invention. For instance, the present invention may be applied to a thermal printer, an ink jet printer, a LED printer, a liquid crystal printer, a bubble jet printer, a dot impact printer, and a silver salt photography. Further, the CPUs 60 and 70 may be replaced by a single CPU if the buses 61 and 70a in FIG. 1 are connected together.

As explained in detail in the foregoing description, the present invention can provide an image forming apparatus which can execute image forming in an image forming unit not only in forward operation of scanning means in an image reading unit but also in return operation thereof, thereby shortening the processing time required for consecutive image forming operations.

While the invention has been described in connection with what is presently considered to be the most practical and preferred embodiment, it is to be understood that the invention is not limited to the disclosed embodiment, but, on the contrary, is intended to cover various modifications and equivalent arrangements included within the scope of the appended claims, which scope is to be accorded the broadest interpretation so as to encompass all such modifications and equivalent arrangements.

What is claimed is:

1. An image forming apparatus provided with a scanner part and a printer part, comprising:
   means for reciprocally scanning an original to convert an image of the original to image data;
   means for driving said scanning means so that the image data converted by said scanning means includes first image data when said original is scanned in a first scanning direction and second image data when the original is scanned in a second scanning direction opposite to the first scanning direction;
   means for storing said first and second image data;
   means for alternately writing said first and second image data into said storing means;
   means for reading the first image data from said storing means in accordance with a first reading order, and reading the second image data from said storing means in accordance with a second reading order, so that data containing said first and second image data is output from said storing means when said second reading order is opposite to said first reading order; and
   means for sending to a first predetermined place a first print output corresponding to the first image data read by said reading means, and sending to a second predetermined place a second print output corresponding to the second image data read by said reading means.

2. An apparatus according to claim 1, wherein said reading means includes means for accessing said storing means, such that said first image data is read out of said storing means in accordance with a first read address data corresponding to said first reading order, and such that said second image data is read out of said storing means in accordance with a second read address data corresponding to said second reading order, the first and second address data being switched in response to switching between the first and second scan directions of said original.

3. An apparatus according to claim 2, wherein said accessing means includes:
   start address setting means for generating a start address data;
   address step setting means for generating an address step data; and
   means for adding the address step data generated by the start address setting means to the start address data or the current read address data provided by the adding means, to provide either of said first and second read address data, such that when the address step data is positive while the start address data represents a start position of the scanning of said scanning means, said adding means provides the first address data which is incremented with the positive address step data, and such that when the address step data is negative while the start address data represents an end position of the scanning of said scanning means, said adding means provides the second address data which is decremented with the negative address step data.

4. An apparatus according to claim 3, wherein said address step means includes means for alternatively generating the positive and negative address step data in response to switching between the first and second scan directions of said original.

5. An apparatus according to claim 2, wherein said writing means includes:
   means for providing a write start address data; and means for fetching the write start address data, and changing a content of the fetched write start address data with a given clock rate to provide a write address data, said write address data designating an address of writing said first and second image data into said storing means.

6. An apparatus according to claim 1, wherein said scanning means includes:
means for capturing the image of said original to provide a captured image signal;
means for compensating for a black shading value of the captured image signal to provide a black shading compensated signal; and
means for compensating for a white shading value of the captured image signal to provide a white shading compensated signal, the image data converted by said scanning means being obtained from the black and white shading compensated signals.

7. An apparatus according to claim 1, wherein said storing means includes:
first memory means for storing said first and second image data information;
second memory means for storing said first and second image data information; and
means connecting said scanning means to said first memory means when either said first or second image data is written into said first memory means, while the other of said first and second image data is generated as the data containing information of said first and second image data, and connecting said scanning means to said second memory means when the other of said first and second image data is written into said second memory means, while either said first or second image data is generated as the data containing information of said first and second image data.

8. An image forming apparatus provided with a scanner part and printer part, comprising:
means for scanning an original in a first scanning direction to provide first image data, and for scanning the original in a second scanning direction to provide second image data, said second scanning direction being opposite to the first scanning direction;
means for storing said first and second image data
means for fetching from said storing means said first and second image data, and alternatively forming images of said first and second image data on printing media; and
means for sending to a first predetermined place the printing media with a first print output corresponding to the first image data, and sending to a second predetermined place the printing media with a second print output corresponding to the second image data.

9. An apparatus according to claim 8, further comprising:
means for storing information of said first and second image data;
means for alternatively writing said first and second image data into said storing means; and
means for reading the first image data from said storing means in accordance with a first reading order, and reading the second image data from said storing means in accordance with a second reading order, so that data containing information of said first and second image data is output from said storing means, provided that said second reading order is opposite to said first reading order.

10. An apparatus according to claim 9, wherein said reading means includes means for accessing said storing means, such that said first image data is read out of said storing means in accordance with a first read address data corresponding to said first reading order, and such that said second image data is read out of said storing means in accordance with a second read address data corresponding to said second reading order, the first and second address data being switched in response to switching between the first and second scanning directions of said original.

11. An apparatus according to claim 10, wherein said accessing means includes:
start address means for generating a start address data;
address step means for generating an address step data; and
means for adding the address step data to the start address data to provide either of said first and second read address data, such that when the address step data is positive while the start address data represents a start position of the scanning of said scanning means, said adding means provides the first address data which is incremented with the positive address step data, and such that when the address step data is negative while the start address data represents an end position of the scanning of said scanning means, said adding means provides the second address data which is decremented with the negative address step data.

12. An apparatus according to claim 11, wherein said address step means includes means for alternatively generating the positive and negative address step data in response to switching between the first and second scanning directions of said original.

13. An apparatus according to claim 9, wherein said writing means includes:
means for providing a write start address data; and
means for fetching the write start address data, and changing the content of the fetched write start address data with a given clock rate to provide a write address data, said write address data designating an address of writing said first and second image data into said storing means.

14. An apparatus according to claim 8, wherein said scanning means includes:
means for capturing the image of said original to provide a captured image signal;
means for compensating for a black shading value of the captured image signal to provide a black shading compensated signal; and
means for compensating for a white shading value of the captured image signal to provide a white shading compensated signal, the image data converted by said scanning means being obtained from the black and white shading compensated signals.

15. An apparatus according to claim 8, wherein said storing means includes:
first memory means for storing said first and second image data information;
second memory means for storing said first and second image data information;
means for connecting said scanning means to said first memory means when either said first or second image data is written into said first memory means while the other of said first and second image data is generated as the data containing information of said first and second image data, and connecting said scanning means to said second memory means when the other of said first and second image data is written into said second memory means while either said first or second image data is generated as the data containing information of said first and second image data.

16. A method for capturing an image of an original, comprising the steps of:

reciprocally scanning the original to capture the image thereof;

converting the captured image to image data which includes first image data obtained when said original is scanned in a first scanning direction and second image data obtained when said original is scanned in a second scanning direction opposite the first scanning direction;

alternatively writing said first and second image data into a memory device;

reading the first image data from said memory device in accordance with a first reading order;

reading the second image data from said memory device in accordance with a second reading order which is opposite to said first reading order;

generating data containing first and second image data information; and sending to a first predetermined place a first print output corresponding to the first image data, and sending to a second predetermined place a second print output corresponding to the second image data.

17. A method for forming an image on printing media, comprising the steps of:

scanning an original in a first scanning direction to provide first image data;

scanning the original in a second scanning direction to provide second image data, said second scanning direction being opposite to the first scanning direction;

storing said first and second image data alternatively fetching said stored said first and second image data to successively form images of said first and second image data on the printing media; and sending to a first predetermined place a first print output corresponding to the first image data, and sending to a second predetermined place a second print output corresponding to the second image data.

* * * * *